United States Patent [19]

Kawakami et al.

[11] Patent Number: 5,369,191

[45] Date of Patent: Nov. 29, 1994

[54] AROMATIC THIOETHER KETONE/THIOETHER SULFONE COPOLYMER AND PRODUCTION PROCESS THEREOF

[75] Inventors: Yukichika Kawakami; Zenya Shiiki, both of Iwaki, Japan

[73] Assignee: Kureha Kagaku Kogyo K.K., Tokyo, Japan

[21] Appl. No.: 3,034

[22] Filed: Jan. 12, 1993

[30] Foreign Application Priority Data

| Jan. 23, 1992 | [JP] | Japan | 4-34251 |
| Mar. 26, 1992 | [JP] | Japan | 4-101692 |
| Oct. 23, 1992 | [JP] | Japan | 4-307908 |

[51] Int. Cl.⁵ .................... C08G 75/14; C08L 81/04
[52] U.S. Cl. ..................... 525/471; 525/537
[58] Field of Search ................ 525/471, 537

[56] References Cited

U.S. PATENT DOCUMENTS

| 4,895,925 | 1/1990 | Satake et al. | 528/226 |
| 5,008,370 | 4/1991 | Kashiwadate et al. | 528/388 |
| 5,120,808 | 6/1992 | Satake et al. | 525/537 |

FOREIGN PATENT DOCUMENTS

| 210377 | 2/1987 | European Pat. Off. |
| 459620A3 | 12/1991 | European Pat. Off. |
| 4206996A1 | 9/1992 | Germany |
| 62-27434 | 2/1987 | Japan |
| 64-54031 | 3/1989 | Japan |
| 2-225527 | 9/1990 | Japan |

OTHER PUBLICATIONS

Kirk-Othmer "Encyclopedia of Chemical Technology" Third Edition, vol. 6, pp. 798-803.

*Primary Examiner*—Melvyn I. Marquis
*Assistant Examiner*—Helen F. Lee
*Attorney, Agent, or Firm*—Lowe, Price, LeBlanc & Becker

[57] ABSTRACT

Disclosed herein are an aromatic thioether ketone/thioether sulfone random copolymer comprising phenylene thioether ketone recurring units (I) and phenylene thioether sulfone recurring units (II), (a) the compositional ratio (I:II) of the recurring units (I) to the recurring units (II) ranging from 98:2 to 65:35, (b) the solution viscosity ($\eta_{inh}$) being at least 0.3 dl/g, (c) the melt crystallization time (f) being at least 3 minutes, (d) the melting point (Tm) being 300°–350° C., (e) the glass transition temperature being at least 125° C., (f) the retention (400° C./20 min) of melt crystallization enthalpy ($\Delta Hmc$) being at least 60%, and (g) the average particle size being at least 0.1 mm, and the production process thereof.

5 Claims, No Drawings

AROMATIC THIOETHER KETONE/THIOETHER SULFONE COPOLYMER AND PRODUCTION PROCESS THEREOF

FIELD OF THE INVENTION

This invention relates to aromatic thioether ketone/thioether sulfone copolymers combining a high melting point with a high glass transition temperature, and at the same time having sufficient melt stability, excellent extrudability and excellent stretch-processability of the extrudate, and a process for the production thereof. The aromatic thioether ketone/thioether sulfone copolymers according to this invention can be used in various kinds of formed products, for example, films and fibers.

BACKGROUND OF THE INVENTION

In the fields of the electronic and electrical industry and the automobile, aircraft and space industries, there is a strong demand in recent years for crystalline thermoplastic resins having high heat resistance of 300° C. or higher in terms of melting point and moreover easy melt processability. Among these crystalline thermoplastic resins having high heat resistance, poly(arylene thioetherketones) (hereinafter abbreviated as "PTKs") are ultrahigh-heat-resistant aromatic polymers combining a high melting point of about 350° C. with a high glass transition temperature of about 135° C. There is hence a strong demand for provision of such polymers in the fields of frontier technologies, and the like.

PTKs can be produced by causing an alkali metal sulfide and a 4,4'-dihalobenzophenone to undergo a dehalogenation and sulfurization reaction in an organic amide solvent (Japanese Patent Application Laid-Open No. 54031/1989). However, PTKs involved a problem that when they are formed and processed by, for example, extrusion and subsequent stretching or sheet forming, it is considerably difficult from the technical viewpoint to apply these forming and processing methods thereto. This problem was believed to be attributed to the formation of coarse spherulites in a product formed by the extrusion owing to the too high crystallization.

In order to lower the crystallization rate of a PTK, the present inventor attempted to reduce the crystallinity and crystallization rate of the PTK by random copolymerization of its monomer with monomers of a kind different from the first-mentioned monomer. Namely, a 4,4'-dihalobenzophenone as a dihalogenated aromatic compound was combined with dihalobenzenes as dihalogenated aromatic compounds of a kind different from the 4,4'-dihalobenzophenone, respectively, followed by their reaction with an alkali metal sulfide, thereby producing an aromatic thioether ketone/thioether random copolymer somewhat lowered in crystallinity. However, it was difficult to obtain a random copolymer having a high molecular weight in the form of granules because the 4,4'-dihalobenzophenone and dihalobenzenes were different in reactivity from each other.

On the other hand, there has been proposed a block copolymer containing poly(arylene thioether-ketone) blocks and poly(arylene thioether) blocks (Japanese Patent Application Laid-Open No. 225527/1990). This block copolymer can be obtained by a process in which an alkali metal sulfide is reacted with a 4,4'-dihalobenzophenone in the presence of a poly(arylene thioether) prepolymer having reactive terminal groups to form a poly(arylene thioetherketone) block, or a process in which a poly(arylene thioether) prepolymer having reactive terminal groups is reacted with a poly(arylene thioether-ketone) prepolymer having reactive terminal groups. It is possible to collect a polymer moderately reduced in crystallization rate by suitably selecting reaction conditions in the production process. However, this block copolymer involves problems such that its melting point and glass transition temperature are lowered to a considerable extent compared with the PTK homopolymer, and its polymerization operation is complicated.

OBJECTS AND SUMMARY OF THE INVENTION

It is an object of this invention to provide aromatic polymers which have predominant recurring units composed of arylene thioether excellent extrudability and excellent stretch-processability of the extrudate, combine a high melting point with a high glass transition temperature, possess sufficient melt stability, and are in the form of granules.

The present inventors carried out an extensive investigation with a view toward solving the above-described problems involved in the prior art. As a result, it was found that when a 4,4'-dihalobenzophenone as a dihalogenated aromatic compound is combined with a 4,4'-dihalodiphenylsulfone as a dihalogenated aromatic compound of a kind different from the 4,4'-dihalobenzophenone, followed by their reaction with an alkali metal sulfide, an aromatic thioether ketone/thioether sulfone random copolymer having a high molecular weight can be obtained with comparative ease. The thus-obtained aromatic thioether ketone/thioether sulfone copolymer had moderately reduced crystallinity, a high melting point and moreover a glass transition temperature higher than that of the PTK homopolymer.

The present inventors have conducted a further investigation. As a result, it has also been found that when proportion of the 4,4'-dihalobenzophenone to the 4,4'-dihalodiphenylsulfone is selectively limited to a specific range, a copolymer moderately reduced in crystallization rate can be obtained in the form of granules.

The present invention has been brought to completion on the basis of these findings.

According to this invention, there is thus provided an aromatic thioether ketone/thioether sulfone random copolymer comprising recurring units of the formula (I):

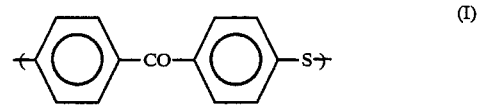

and recurring units of the formula (II):

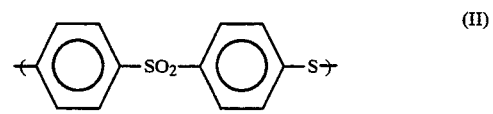

(a) the compositional ratio (I:II) of the recurring units (I) to the recurring units (II) ranging from 98:2 to 65:35, (b) the solution viscosity ($\eta_{inh}$) being at least 0.3 dl/g as determined by viscosity measurement at 30° C.

and a polymer concentration of 0.4 g/dl in a 1:1 (by weight) mixed solvent of m-chlorophenol and 1,2,4-trichlorobenzene,
(c) the melt crystallization time (r) being at least 3 minutes,
(d) the melting point (Tm) being 300°–350° C.,
(e) the glass transition temperature being at least 125° C.,
(f) the retention (400° C./20 min) of melt crystallization enthalpy ($\Delta Hmc$) being at least 60%, wherein the $\Delta Hmc$ retention (400° C./20 min) is determined by measuring, by means of a differential scanning calorimeter, (1) melt crystallization enthalpy, $\Delta Hmc$ (400° C./1 min) and (2) melt crystallization enthalpy, $\Delta Hmc$ (400° C./21 min) when cooled at a rate of 10° C./min from 400° C. after the copolymer is held at 50° C. for 5 minutes in an inert gas atmosphere, heated to 400° C. at a rate of 100° C./min and then held, respectively, for 1 minute at 400° C. and for 21 minutes at 400° C., and then calculating the retention in accordance with the following equation:

$\Delta Hmc$ retention (400° C./20 min)=

[$\Delta Hmc$ (400° C./21 min)/$\Delta Hmc$ (400° C./1 min)]×100, and
(g) the average particle size being at least 0.1 mm.

According to this invention, there is also provided a process for the production of an aromatic thioether ketone/thioether sulfone copolymer, which comprises reacting an alkali metal sulfide with dihalogenated aromatic compounds including a 4,4'-dihalobenzophenone and a 4,4'-dihalodiphenylsulfone in an organic amide solvent containing water under the following conditions (1)–(3):
(1) the molar ratio of the amount of the charged 4,4'-dihalobenzophenone to the amount of the charged 4,4-dihalodiphenylsulfone being 98:2–65:35,
(2) the ratio of the amount of the charged dihalogenated aromatic compounds to the amount of the charged alkali metal sulfide being 0.95–1.2 (mol/mol),
(3) the reaction being conducted by at least the following two steps:
in the first step, the alkali metal sulfide and the dihalogenated aromatic compounds being subjected to a polymerization reaction in a temperature range of 60°–260° C. for 0.5–30 hours in the water-containing organic amide solvent in which the ratio of the water content to the amount of the charged organic amide solvent is controlled within a range of 1–20 (mol/kg), and
in the second step, the ratio of the water content to the amount of the charged organic amide solvent being controlled within a range of 7–20 (mol/kg), and the polymerization reaction mixture being held for 0.1–10 hours in a temperature range of 265°–320° C.

After completion of the second step, the polymerization reaction mixture is generally cooled to a temperature within a range not higher than 150° C. while stirring it, whereby the resulting copolymer can be easily collected in the form of granules.

DETAILED DESCRIPTION OF THE INVENTION

Features of the present invention will hereinafter be described in detail.

[Production Process of Aromatic Thioether Ketone/Thioether Sulfone Copolymers]

A. Raw materials

As raw materials for an aromatic thioether ketone/thioether sulfone copolymer of this invention, whose crystallization rate has been reduced moderately (hereinafter abbreviated as "aromatic copolymer"), are used dihalogenated aromatic compounds, an alkali metal sulfide, an organic amide solvent and water as essential components.

<Dihalogenated aromatic compounds>

The random aromatic copolymer according to this invention is synthesized by using, as dihalogenated aromatic compounds, a 4,4'-dihalobenzophenone and a 4,4'-dihalodiphenylsulfone in combination with each other.

The 4,4'-dihalobenzophenone is a component which fills the role of forming a constituent for forming a backbone of the aromatic copolymer permitting easy melt processing and having high melting point and glass transition temperature. 4,4'-Dichlorobenzophenone and 4,4'-dibromobenzophenone are preferred as the 4,4'-dihalobenzophenone from the viewpoint of reactivity, economy, and physical properties of the resulting aromatic copolymer.

Those whose reactivity to the alkali metal sulfide is near or higher than that of 4,4'-dihalobenzophenones are classified as halogen-substituted aromatic compounds of Group (a). In addition to 4,4'-dihalobenzophenones, dihalobenzophenones other than 4,4'-isomers, dihalodiphenylsulfone isomers and the like belong to Group (a).

Of these, 4,4'-dihalodiphenylsulfones are excellent as a component for not only reducing the crystallization rate of the resulting polymer, but also facilitating the melting and granulation of the aromatic copolymer formed in the polymerization process.

The halogen-substituted aromatic compounds belonging to Group (a), in particular, 4,4'-dihalodiphenylsulfones, have the following effects: (1) They have a high effect to reduce the crystallization rate and hence show a sufficient effect by their addition in a small amount. (2).They have reactivity close to that of 4,4'-dihalobenzo-phenones. Therefore, as the fact that monomers having similar reactivity to each other are excellent in copolymerizability with each other has been described in, for example, "KIRK-OTHMER'S ENCYCLOPEDIA OF CHEMICAL TECHNOLOGY", 3rd. ed., Vol. 6, p. 802, the combination of these monomers generally results in a random copolymer when they are polymerized at the same time. (3) The melting point of the resulting aromatic copolymer is not very lower compared with the PTK homopolymer, but its glass transition temperature is heightened.

On the other hand, those whose reactivity to the alkali metal sulfide is significantly lower than that of 4,4'-dihalobenzophenones are classified as halogen-substituted aromatic compounds of Group (b). As illustrative compounds belonging to Group (b), may be mentioned mono-, di- or tri-halogenated or higher polyhalogenated derivatives of aromatic compounds such as benzene, alkylbenzenes, biphenyl and diphenyl ether.

In addition to the dihalogenated aromatic compounds of Group (a), a mono-, di- or tri-halogenated or higher polyhalogenated derivative of an aromatic compound such as benzene, alkylbenzene, biphenyl or diphenyl ether may be used as a minor component within limits not impairing the object of this invention. These compounds are useful as an end-capping agent.

<Alkali metal sulfide>

Illustrative examples of the alkali metal sulfide useful in the practice of this invention include sodium sulfide, lithium sulfide, potassium sulfide, rubidium sulfide, cesium sulfide and mixtures of two or more these compounds.

These alkali metal sulfides can be used as hydrates or aqueous mixtures, or in any anhydrous form. In particular, alkali metal sulfides in the form of a hydrate or aqueous mixture having a water content within the range of the polymerization conditions are advantageous in that a dehydration step prior to the polymerization can be omitted.

Among these alkali metal sulfides, sodium sulfide is industrially preferred for its low price. An alkali metal sulfide which may be formed in situ in the reaction system can also be used.

It is permissible to add a carboxylate or carbonate of an alkali metal or alkaline earth metal within limits not contrary to the object of this invention.

<Organic amide solvent>

As reaction media useful for the production process of the aromatic copolymer according to this invention, aprotic polar organic solvents having excellent heat stability and alkali resistance can be used. Of these, organic amide solvents (including carbamic amides) are particularly preferred.

As such organic amide solvents, may be mentioned N-methylpyrrolidone, N-ethylpyrrolidone, dimethylimidazolidinone, tetramethylurea, hexamethylphosphoric triamide, dimethylacetamide, etc. Among these organic amide solvents, N-methylpyrrolidone is particularly preferred from the viewpoint of thermal and chemical stability, the smoothness of the polymerization reaction and economy.

B. Polymerization process and reaction conditions

A feature of the production process of the aromatic copolymer according to this invention is to use a 4,4'-dihalobenzophenone and a 4,4'-dihalodiphenylsulfone as dihalogenated aromatic compounds in combination with each other in a fixed proportion selected. The recurring units of the formula (II), which are formed by the reaction of the 4,4'-dihalodiphenylsulfone with the alkali metal sulfide, reduces the crystallization rate of the aromatic copolymer.

Another feature of the production process according to this invention is that the polymerization process comprises at least two steps. Namely, the first step is a process in which the dihalogenated aromatic compounds of different kinds are subjected to a polymerization reaction with the alkali metal sulfide in a temperature not higher than 260° C. in a water-containing organic amide solvent to form a prepolymer required for a phase-separation polymerization in the second step. The second step subsequent to the first step is a process in which the prepolymer is held for at least 0.1 hours at a temperature not lower than 265° C. in a water-containing organic amide solvent. It is conjectured that at this time, the resulting polymer is melted to achieve liquid-liquid phase separation into a polymer melt phase and a solvent phase. In this step, the liquid-liquid phase separation is facilitated by maintaining a high water content in the organic amide solvent. After completion of the second step, an intended aromatic copolymer is provided in the form of granules by cooling the reaction mixture with stirring in accordance with the conventionally-known method.

The polymerization process and reaction conditions will hereinafter be described more specifically.

(1) Composition of dihalogenated aromatic compounds

In this invention, the dihalogenated aromatic compounds are used as a mixture containing a 4,4'-dihalobenzophenone as a major component and a 4,4'-dihalodiphenylsulfone as a minor component. The molar ratio of the amount of the charged 4,4'-dihalobenzophenone to the amount of the charged 4,4'-dihalodiphenylsulfone may desirably be within a range of 98:2–65:35, preferably 97:3–75:25, more preferably 96:4–85:15.

Any molar ratios of the 4,4'-dihalodiphenylsulfone to the 4,4'-dihalobenzophenone smaller than 2/98 result in a copolymer insufficiently reduced in crystallization rate. On the other hand, any molar ratios greater than 35/65 tend to provide an amorphous copolymer having no melting point.

(2) Water content

In the first step of the polymerization, the water content in the reaction system may desirably be within a range of 1–20 moles per kg of the amount of the charged organic amide solvent. The use of water-containing organic amide solvent having a water content lower than 1 mole/kg may possibly induce decomposition in the polymerization reaction. On the other hand, water contents higher than 20 moles/kg are accompanied by a potential problem that the polymerization reaction may be delayed to a too significant extent to provide a copolymer having a high molecular weight.

In the second step of the polymerization, the water content may desirably be within a range of 7–20 moles per kg of the amount of the charged organic amide solvent. Water contents either lower than 7 moles/kg or more than 20 moles/kg involve a potential problem that the granulation rate of the resulting copolymer may be reduced to a significant extent. If the organic amide solvent does not contain a desired amount of water after completion of the first step, water may be added prior to the initiation of the second step to adjust the water content in a reaction system to the desired amount.

(3) Composition of monomers charged

The amount of the charged alkali metal sulfide (including those formed in situ) is within a range of 0.1–5 moles, preferably 0.2–4 mole, more preferably 0.3–2 moles per kg of the amount of the charged organic amide solvent. Any amounts less than 0.1 mole/kg result in poor productivity of the polymer and are hence disadvantageous from the economical viewpoint. Any amounts greater than 5 moles/kg may possibly result in a reaction system high in viscosity and hence make it difficult to stir the reaction system.

The amount of the charged dihalogenated aromatic compounds including the 4,4'-dihalobenzophenone and 4,4'-dihalodiphenylsulfone [excluding the amount of the charged halogenated aromatic compound belonging to Group (b)] is within a range of 0.95–1.2 moles, preferably 0.98–1.1 moles, more preferably 1.00–1.05 moles per mole of the amount of the charged alkali metal sulfide. If this ratio is smaller than 0.95 (mole/mole), there is a potential problem of decomposition during the reaction.

To the contrary, any ratios greater than 1.2 (mole/mole) may possibly make it difficult to obtain a polymer having a high molecular weight.

A small portion (desirably not greater than a twentieth of the total amount of the dihalogenated aromatic compounds) of the dihalogenated aromatic compounds belonging to Group (a) may be charged right before the initiation of the second step or during the second step. This facilitates the provision of an aromatic copolymer high in melt stability. The above-described dihalogenated aromatic compound belonging to Group (b) may be charged during either the first step or the second step. It is permissible to add a carboxylate or carbonate of an alkali metal or alkaline earth metal into the reaction system within limits not impairing the object of this invention.

(4) First step

The first step of the polymerization is a preliminary process for the phase-separation polymerization. Namely, in this step, the dihalogenated aromatic compounds are brought into contact with the alkali metal sulfide to conduct polymerization, thereby forming a prepolymer required for the phase-separation polymerization. This step requires to continue the polymerization reaction until it sufficiently proceeds. This step is conducted at a temperature within a range of 60°–260° C., preferably 170°–255° C. If the reaction temperature is lower than 60° C., there is a potential problem that the polymerization reaction may be delayed to a significant extent. On the other hand, any reaction temperatures higher than 260° C. may possibly induce decomposition during the reaction or result in an aromatic copolymer deteriorated in melt stability.

The first step is a process in which a prepolymer required for the achievement of phase separation is formed and may desirably be conducted until a prepolymer having a solution viscosity ($\eta_{inh}$) of at least 0.15 dl/g is formed.

The polymerization time in the first step is within a range of 0.5–30 hours, preferably 1–20 hours, more preferably 1–10 hours. Any reaction time shorter than 0.5 hours involves a potential problem of insufficient polymerization. To the contrary, any reaction time longer than 30 hours may possibly induce decomposition during the polymerization reaction or result in an aromatic copolymer deteriorated in melt stability. In addition, any reaction time exceeding 30 hours results in poor productivity of the polymer and is hence disadvantageous from the economical viewpoint.

One of means for reducing the formation of secondary harmful substances, which are considered to attack the resulting polymer to deteriorate it, to provide an aromatic copolymer having high melt stability is to eliminate oxidizing components, in particular oxygen, in both gaseous phase and liquid phase of the reaction system through times of charging of the monomers, solvent and the like and of polymerization as much as possible.

In order to eliminate oxygen in the gaseous phase, it is effective, for example, to completely purge oxygen with an inert gas, to degas the reaction system under reduced pressure, or to make the reaction system airtight throughout the polymerization reaction. In order to eliminate oxygen in the liquid phase (including an organic amide, water, etc.), it is effective, for example, to use a fresh solvent as distilled, to degas the liquid phase by boiling or reduction of pressure, or to dilute or purge oxygen with a pressurized inert gas.

(5) Second step

The second step of the polymerization is a process of phase-separation polymerization. Namely, this step is considered to be a process in which the prepolymer is melted to form two phases of a molten phase of the aromatic copolymer and a solvent phase during the reaction, the residual alkali metal sulfide, harmful by-products and the like are mostly transferred to the solvent phase to isolate them, and the polymer is mostly condensed repeatedly in the molten polymer phase without being attacked by these harmful substances to grow its molecule. As described above, this step requires to conduct the reaction in a solvent high in water content. Therefore, when the water content of the water-containing organic amide solvent in the first step is low, water may be further added prior to the initiation of this step or during this step, as needed, to adjust the water content in the reaction system.

The second step is conducted at a temperature within a range of 265°–320° C., preferably 280°–310° C. Reaction temperatures lower than 265° C. involve a potential problem that the content of granules of the resulting copolymer may be reduced to a significant extent. To the contrary, reaction temperatures higher than 320° C. are accompanied by a potential problem that decomposition may occur during the reaction, or the vapor pressure in the reaction system may become unduly high and a particular pressure reactor is hence required, resulting in an economical disadvantage.

The second step is conducted until a polymer having a molecular weight significantly higher than that of the prepolymer is formed. Judging from its solution viscosity, the second step is carried out until a polymer having a solution viscosity ($\eta_{inh}$) higher than that of the prepolymer by at least 0.05 dl/g, preferably at least 0.10 dl/g is formed.

The second step is conducted for 0.1–10 hours, preferably 0.2–5 hours. Any reaction time shorter than 0.1 hours involves a potential problem that the content of granules of the resulting copolymer may be reduced to a significant extent. To the contrary, any reaction time exceeding 10 hours may possibly result in an aromatic copolymer deteriorated in melt stability, or be too long to conduct the reaction, leading to poor productivity.

(6) Collection of polymer

After completion of the second step, the resultant aromatic copolymer is provided in the form of granules by cooling the reaction mixture with stirring in accordance with the conventionally-known method.

[Aromatic Thioether Ketone/Thioether Sulfone Copolymers]

A. Chemical structure

The aromatic copolymers in the form of granules according to the present invention are random copolymers having predominant recurring units of the formula (I):

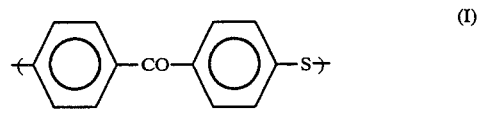

(I)

and containing recurring units of the formula (II):

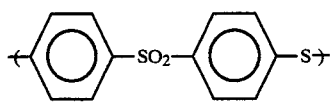

(II)

at a ratio of the recurring units (II) to the recurring units (I), which is within a range of 2/98 to 35/65 (unit/unit), preferably 3/97 to 25/75 (unit/unit), more preferably 4/96 to 15/85 (unit/unit).

B. Physical properties (1) Solution viscosity ($\eta_{inh}$)

When the value of a solution viscosity ($\eta_{inh}$) is used as an index expressing the molecular weight of a polymer, the copolymers according to the present invention are high-molecular weight polymers having a solution viscosity, $\eta_{inh}$ of at least 0.30 dl/g, preferably at least 0.35 dl/g as determined by viscosity measurement at 30° C. and a polymer concentration of 0.4 g/dl in a 1:1 (by weight) mixed solvent of m-chlorophenol and 1,2,4-trichlorobenzene.

Any aromatic copolymers, whose $\eta_{inh}$ is lower than 0.3 dl/g, may possibly be insufficient in physical properties such as mechanical properties. A substantially amorphous sheet of each copolymer, which is also used in the measurements of Tm and the like as described below, is used as a sample for the measurement of $\eta_{inh}$.

(2) Melt crystallization time ($\tau$)

The time required for a copolymer to crystallize from its molten state is a melt crystallization time ($\tau$). Any aromatic copolymers extremely high in crystallization rate, namely, extremely small in the value of $\tau$ are suitable for use in injection molding and the like, but unsuitable for use in extrusion because such copolymers forms coarse spherulites in the course of cooling of its extrudate, resulting in a brittle extruded product. Therefore, they are also unsuitable for use in stretching and sheet forming subsequent to the extrusion because the raw film or sheet obtained by extrusion has already crystallized, whereby difficulties are encountered on stretching or the like. Any copolymers, whose $\tau$ is unduly small, are also difficult to apply to melt spinning, inflation, blow molding, etc.

Therefore, resins suitable for use in extrusion may desirably be reduced in crystallization rate. When $\tau$ is used as an index of extrudability, the value of $\tau$ is preferably within a range of 3-15 minutes, preferably 3.1-10 minutes.

In this invention, the melt crystallization time, $\tau$ means "the time required for melt crystallization from the melting point" of each polymer sample as determined by a differential scanning calorimeter (DSC) at a cooling rate of 10° C. after the polymer sample is heated from 50° C. to 400° C. at a rate of 100° C./min and at an even speed in an inert gas atmosphere and then held for 1 minute at 400° C. to completely melt the polymer sample. The melting point is a value measured in advance in accordance with a method which will be described subsequently.

An aromatic copolymer, whose $\tau$ is shorter than 3 minutes, has a too high crystallization rate to apply it to extrusion. To the contrary, an aromatic copolymer, whose $\tau$ is longer than 15 minutes, requires an unduly long time for annealing and is hence disadvantageous from the economical viewpoint.

(3) Melting point (Tm)

The aromatic copolymers according to the present invention are crystalline copolymers having a high melting point. Namely, the aromatic copolymers of this invention are polymers whose melting point, Tm is as high as 300°-350° C., preferably 305°-345° C.

(4) Glass transition temperature (Tg)

The aromatic copolymers according to the present invention are heat-resistant resins whose glass transition temperature, Tg is at least 125° C., preferably at least 130° C., more preferably at least 135° C.

In the present invention, Tm, $\Delta$Hm and Tg of each aromatic copolymer sample were measured in the following manner. The copolymer sample is melted and pressed for 10 seconds at 380° C. in a hot press, and then placed into water to quench it, thereby forming a substantially amorphous sheet having low degree of crystallinity and a thickness of about 0.2 mm. The thus-obtained amorphous sheet was heated by DSC at a rate of 10° C./min from 30° C. to 400° C. in an inert gas atmosphere so as to determine its respective values.

(5) Retention (400° C./20 min) of melt crystallization enthalpy ($\Delta$Hmc)

The aromatic copolymers according to this invention are melt-stable polymers whose retention (400° C./20 min) of melt crystallization enthalpy ($\Delta$Hmc) is generally at least 60%, preferably at least 80%. In this invention, the $\Delta$Hmc retention (400° C./20 min) is determined by measuring, by means of a differential scanning calorimeter, (1) melt crystallization enthalpy, $\Delta$Hmc (400° C./1 min) and (2) melt crystallization enthalpy, $\Delta$Hmc (400° C./21 min) when cooled at a rate of 10° C./min from 400° C. after each copolymer sample is held at 50° C. for 5 minutes in an inert gas atmosphere, heated to 400° C. at a rate of 100° C./min and then held, respectively, for 1 minute at 400° C. and for 21 minutes at 400° C., and then calculating the retention in accordance with the following equation:

$$\Delta Hmc \text{ retention } (400° C./20 \text{ min}) = [\Delta Hmc (400° C./21 \text{ min})/\Delta Hmc (400° C./1 \text{ min})] \times 100$$

An aromatic copolymer, whose $\Delta$Hmc retention (400° C./20 min) is lower than 60%, may possibly be insufficient in long run property and hence involves a problem from the viewpoint of practical use.

C. Other properties

The aromatic copolymers produced in accordance with the process of this invention can be collected in the form of granules having an average particle size of at least 0.1 mm. The average particle size may desirably be within a range of preferably 0.15-3.0 mm, more preferably 0.2-2.0 mm, most preferably 0.25-1.5 mm. Each of the aromatic copolymers contains granules having a particle size of at least 0.1 mm in a proportion of at least 70 wt. %, preferably at least 75 wt. %, most preferably at least 80 wt. %.

The aromatic copolymers are granular resins having a bulk specific gravity (apparent specific gravity: bulk density) of generally 0.15-0.6 g/cc, preferably 0.2-0.5 g/cc, more preferably 0.25-0.4 g/cc.

The granular resins are extremely easy to collect as described above and in addition, are excellent in handling properties in metering, charging, storing, shipping, etc. because they are also excellent in free-flowing properties and also superb in blocking resistance in a hopper for a forming or molding machine upon forming or molding. Therefore, they have extremely great advantages from the viewpoint of practical use.

The aromatic copolymers according to this invention are soluble in, for example, a mixed solvent of chlorophenol and trichlorobenzene and the like in a low-crystalline state. These solutions can be used in cast molding, coating and the like. It is however possible to make these copolymers insoluble by crystallizing them after molding.

[Forming or Molding Products]

The aromatic copolymers according to this invention can be most preferably used either singly or as blends with other thermoplastic resins, various kinds of reinforcing fibers, various kinds of inorganic fillers and/or the like in extrusion, and stretching, sheet forming and the like subsequent to the extrusion. In addition, they can be applied to melt stretching and spinning, inflation, blow molding, injection molding and the like. Further, their solutions can be applied to casting processes.

These processing methods can be used either singly or in combination to form or mold into various products, for example, stretched films (including lubricating films), unstretched films, sheets, plates, rods, pipes, tubes, profiles, multifilaments, monofilaments, fabrics, unwoven fabrics, split yarns, prepregs, general molded products, etc.

For example, oxides, hydroxides, carbonates, organic acid salts and the like of metals such as Ba, Sr, Ca, Mg, Zn and Li are useful as stabilizers in melt processing for the aromatic copolymers according to this invention.

Various formed and molded products obtained by using the aromatic copolymer of this invention combine excellent heat resistance inherent in the aromatic copolymer with good mechanical properties. As specific example of formed products obtained, may be mentioned unstretched films, stretched films, unstretched fibers and stretched fibers having the following respective physical properties. These formed products include those produced not only by using the aromatic copolymer according to this invention alone, but also by using thermoplastic compositions comprising as a principal component, the aromatic copolymer of this invention, i.e., thermoplastic compositions comprising one or more other thermoplastic resins in a proportion of 50 wt. % or lower, preferably 30 wt. % or lower, more preferably 15 wt. % or lower.

The use of the aromatic copolymers of this invention permits the production of unstretched films having the following physical properties (a)–(d):

(a) density: at least 1.30 g/cm$^3$,
(b) elastic modulus: at least 100 kg/mm$^2$,
(c) strength: at least 3 kg/mm$^2$, and
(d) thickness: 0,001–1 mm.

The use of the aromatic copolymers of this invention permits the production of stretched films having the following physical properties (a)–(d):

(a) density: at least 1.34 g/cm$^3$,
(b) elastic modulus: at least 100 kg/mm$^2$,
(c) strength: at least 3 kg/mm$^2$, and
(d) thickness: 0.001–1 mm.

The use of the aromatic copolymers of this invention permits the production of unstretched fibers having the following physical properties (a)–(d):

(a) density: at least 1.30 g/cm$^3$,
(b) elastic modulus: at least 150 kg/mm$^2$,
(c) strength: at least 5 kg/mm$^2$, and
(d) fiber diameter: 0.001–1 mm.

The use of the aromatic copolymers of this invention permits the production of stretched fibers having the following physical properties (a)–(d):

(a) density: at least 1.34 g/cm$^3$,
(b) elastic modulus: at least 200 kg/mm$^2$,
(c) strength: at least 5 kg/mm$^2$, and
(d) fiber diameter: 0.001–1 mm.

[Application Fields]

The aromatic copolymers according to the present invention have good properties such as high melting point, high glass transition temperature, electronic insulating property, chemical resistance and oxidation resistance and can hence be used in various fields, for example, as electric parts (connectors, sealants, films for magnetic recording, capacitor films, FPCs, tape carriers, insulating films, insulating papers, plastic magnets, etc.), mechanical parts (camera parts, watch and clock parts, sliding parts, etc.), car parts (carburetors, canisters, reflectors, etc.), and so on by making the best use of these properties. In addition to the formed and molded products, they may be used as coating materials, caulking materials and the like in the form of powder or a solution.

ADVANTAGES OF THE INVENTION

The present invention can provide granular aromatic thioether ketone/thioether sulfone copolymers combining a high melting point with a high glass transition temperature and having sufficient melt stability and improved extrudability.

The aromatic thioether ketone/thioether sulfone copolymers according to this invention are reduced in crystallization rate and hence suitable for use, particularly, in extrusion.

The aromatic thioether ketone/thioether sulfone copolymers according to this invention can be collected in the form of granules. Therefore, they are good in handling properties in filtration, washing, drying, shipping and the like, for example, in a collection step after polymerization and can also be easy to handle upon forming or molding.

According to the production process of the present invention, it is possible to economically and industrially produce aromatic copolymers combining a high melting point with a high glass transition temperature. Their applications can hence be developed into electronic and mechanical fields, and the like, in which suitable materials have heretofore not existed, or if any, their use has been limited due to their extremely high prices.

EMBODIMENTS OF THE INVENTION

The present invention will hereinafter be described specifically by the following examples and comparative examples. It should however be borne in mind that the present invention is not limited only to the following examples.

[Examples 1–7]

A titanium-lined autoclave equipped with a stirrer was charged with NMP (N-methylpyrrolidone) as an organic amide solvent and Na$_2$S·nH$_2$O (n=5.06) as an alkali metal sulfide in respective proportions given in Table 1. After distilling out part of water of hydration as needed, the autoclave was charged with 4,4'-dichlorobenzophenone and 4,4'-dichlorodiphenylsulfone and optionally distilled water. The compositions of the charged components are as shown in Table 1.

After the autoclave being purged with nitrogen, the respective contents were heated with stirring to perform the respective first steps. Incidentally, in Examples 3, 6 and 7, degassing under reduced pressure (for about 10 minutes at about 30 Torr) was conducted prior to the purging with nitrogen. In the first steps of Examples 2 and 5, heating was conducted for 1 hour at 180° C. and then for 2 hours at 200° C. as shown in Table 1.

After completion of the respective first steps, water was further added as needed, and the contents were further heated with stirring to perform the respective second steps. The amounts of the additionally charged water and other polymerization conditions are as shown in Table 1.

After completion of the respective second steps, each of the reaction mixtures was cooled to room temperature while stirring it, thereby completing granulation.

Each of the reaction mixtures was taken out of the autoclave and diluted double by volume with NMP. The reaction mixture diluted with NMP was filtered through a filter paper to separate solids. The thus-obtained solids were washed with acetone, then dispersed in acetone to form a slurry. The resulting slurry was sifted by a screen having an opening size of 0.1 mm to divide the solids into 0.1 mm-on granules and 0.1 mm-pass fine powder. The thus-obtained granules and powder were separately washed with water and dried at about 100° C. The content of the granules was determined from the ratio of the weight (g) of the granules to the total weight (g) of the granules and the powder.

The proportions of C, H and S in the thus-obtained granules were determined by elemental analysis, thereby calculating compositional values of each copolymer. The results are given collectively in Table 2.

With respect to the respective granule samples, their solution viscosities, $\eta_{inh}$, which serve as an index of their molecular weights, were determined in the following manner. Each of the granule samples was melted under heat in a hot press, pressed and then quenched to form a substantially amorphous sheet having a thickness of about 0.2 mm. A portion thereof was dissolved in a 1:1 (by weight) mixed solvent of m-chlorophenol and 1,2,4-trichlorobenzene to measure its solution viscosity at 30° C. and a polymer concentration of about 0.4 g/dl. The results are shown in Table 2.

With respect to thermal properties, Tg and Tm were measured by heating each amorphous sheet by means of DSC at a rate of 10° C./min from 30° C. to 400° C. in an inert gas atmosphere.

The retention of melt crystallization enthalpy ($\Delta$Hmc) was measured and calculated in the following manner. Each polymer sample was held at 50° C. for 5 minutes in an inert gas atmosphere by means of a differential scanning calorimeter, quickly heated from 50° C. to 400° C. at a rate of 100° C./min, held for 1 minute at 400° C. to completely melt the polymer sample and then cooled at a rate of 10° C./min to measure $\Delta$Hmc (400° C./1 min). On the other hand, the polymer sample was quickly heated from 50° C. to 400° C. at a rate of 100° C./min in the same manner as described above, held for 21 minutes at 400° C. in the molten state and then cooled at a rate of 10° C./min to measure $\Delta$Hmc (400° C./21 min).

The $\Delta$Hmc retention was calculated in accordance with the following equation:

$\Delta$Hmc retention (400° C./20 min)=

[$\Delta$Hmc (400° C./21 min)/$\Delta$Hmc (400° C./1 min)]×100

The melt crystallization time, f was determined by measuring "the time required for melt crystallization from the melting point" of each polymer sample by means of a differential scanning calorimeter (DSC) when cooled at a rate of 10° C. from 400° C. after the polymer sample was heated from 50° C. to 400° C. at a rate of 100° C./min in an inert gas atmosphere, then held for 1 minute at 400° C. to completely melt the polymer sample.

The results are given collectively in Table 2.

[Comparative Examples 1-4]

In Comparative Examples 1-3, polymerization was conducted under the same conditions as in Example 2 or 3 except that the compositions of the charged 4,4'-dichlorobenzophenone and 4,4'-dichlorodiphenylsulfone were changed. In Comparative Example 4, polymerization was conducted under the same conditions as in Example 1 except that the polymerization in the first step was conducted in a time as short as 0.3 hours.

Since a granular polymer was obtained in Comparative Example 3, this polymer was used. In Comparative Examples 1 and 2, polymers in the form of substantially fine powder were only able to be obtained. Therefore, these polymers were formed respectively into substantially amorphous sheets having a thickness of about 0.2 mm by hot pressing to determine the solution viscosities, $\eta_{inh}$ and thermal properties of the amorphous sheets thus formed.

The polymer obtained in Comparative Example 4 was too low in molecular weight to form into a sheet. Therefore, the measurements of its composition, $\eta_{inh}$ and thermal properties were omitted.

[Comparative Example 5]

A titanium-lined autoclave was charged with 320 g of hydrated sodium sulfide (water content: 53.8 wt. %) and 600 g of NMP. While heating the contents to 200° C., 130 g of water, 110 g of NMP and 1.3 g of H$_2$S were distilled out. Thereafter, 10 g of water, 191 g of p-dichlorobenzene and 435 g of NMP were fed, followed by heating of the contents for 4 hours at 220° C. and further for 4 hours at 230° C., thereby preparing a reaction solution.

An autoclave was charged with 501 g of the reaction solution thus obtained, 8.0 g of hydrated sodium sulfide (water content: 53.8 wt. %), 63.4 g of 4,4'-dichlorobenzophenone, 278 g of NMP and 90 g of water. After the autoclave being purged with nitrogen, the contents were reacted for 30 minutes at 265° C.

A liquid mixture of 4,4'-dichlorobenzophenone and 70 g of NMP was fed, followed by heating of the contents for 30 minutes at 240° C. After completion of the polymerization reaction, a polymer in the form of granules was collected in the same manner as in Example 1.

This polymer was an aromatic thioether ketone/-thioether block copolymer comprising at least one poly(phenylene thioether-ketone) block represented by the formula:

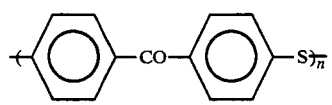

and at least one poly(phenylene thioether) block represented by the formula:

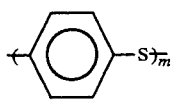

The composition and thermal properties of the granular block copolymer thus obtained were determined. The results are given collectively in Table 2.

(unit/unit) and $\eta_{inh}$ of 0.51 dl/g from the results of its elemental analysis and solution viscosity measurement.

To 100 parts by weight of Resin (P-6), were added 0.45 parts by weight of strontium carbonate and 0.05 parts by weight of slaked lime. They were then intimately mixed in a Henschel mixer into a blend. The thus-obtained blend was extruded in the form of a strand through a twin-screw midget extruder equipped with a nozzle 3 mm across at a melting temperature of

TABLE 1

| | First step | | | | | | | | Second step | | | | |
|---|---|---|---|---|---|---|---|---|---|---|---|---|---|
| | NMP (kg) | Na₂S (mol) | Water (mol) | —CO— *1 (mol) | —SO₂— *2 (mol) | DCB *4 (mol) | Temp (°C.) | Time (hrs) | Water added (mol) | Monomer added *5 (mol) | inh of prepolymer (dl/g) | Temp (°C.) | Time (hrs) |
| Ex. 1 | 2.00 | 1.51 | 9.8 | 1.37 | 0.15 | — | 200 | 3 | 7.2 | — | 0.22 | 291 | 0.5 |
| Ex. 2 | 2.00 | 1.51 | 17.0 | 1.44 | 0.08 | — | 180 200 | 1 2 | 0 | 0.03 *3 | 0.33 | 292 | 0.5 |
| Ex. 3 | 2.00 | 1.50 | 23.2 | 1.23 | 0.31 | — | 220 | 3 | 0 | 0.06 *1 | 0.25 | 282 | 0.5 |
| Ex. 4 | 2.00 | 1.51 | 17.0 | 1.37 | 0.15 | — | 140 | 6 | 0 | 0.03 *1 | 0.20 | 291 | 0.5 |
| Ex. 5 | 2.00 | 1.51 | 17.0 | 1.37 | 0.15 | 0.15 | 180 200 | 1 2 | 0 | — | 0.21 | 291 | 0.5 |
| Ex. 6 | 2.00 | 1.92 | 18.8 | 1.72 | 0.20 | — | 220 245 | 1 1 | 0 | 0.08 *1 | 0.32 | 295 | 0.3 |
| Ex. 7 | 2.00 | 2.06 | 18.7 | 1.96 | 0.10 | — | 220 245 | 1 1.5 | 0 | 0.08 *1 | 0.30 | 300 | 0.3 |
| Comp. Ex. 1 | 2.00 | 1.51 | 17.0 | 1.52 | 0 | — | 180 200 | 1 2 | 0 | 0.03 *3 | 0.31 | 292 | 0.5 |
| Comp. Ex. 2 | 2.00 | 1.51 | 17.0 | 1.51 | 0.01 | — | 180 200 | 1 2 | 0 | 0.03 *3 | 0.26 | 292 | 0.5 |
| Comp. Ex. 3 | 2.00 | 1.51 | 10.0 | 0.83 | 0.69 | — | 200 | 3 | 10.0 | — | 0.19 | 270 | 0.5 |
| Comp. Ex. 4 | 2.00 | 1.51 | 17.0 | 1.37 | 0.15 | — | 200 | 0.3 | 0 | — | <0.10 | 291 | 0.5 |

(Notes)
*1 4,4'-Dichlorobenzophenone.
*2 4,4'-Dichlorodiphenylsulfone.
*3 1,2,4-Trichlorobenzene.
*4 1,4-Dichlorobenzene.
*5 Monomer added was dissolved in 30 g of NMP before charging

TABLE 2

| | Content of granules (wt. %) | Composition *9 (unit/unit) | $\eta_{inh}$ (dl/g) | Melt crystallization time τ (min) | Tg (°C.) | Tm (°C.) | ΔHmc retention (%) | Average particle size *6 (mm) | Apparent specific gravity *7 (g/cc) |
|---|---|---|---|---|---|---|---|---|---|
| Ex. 1 | 96 | 90/10 | 0.54 | 3.6 | 139 | 331 | 80 | 0.40 | 0.29 |
| Ex. 2 | 93 | 95/5 | 0.55 | 3.5 | 137 | 341 | 85 | 0.35 | 0.35 |
| Ex. 3 | 96 | 79/21 | 0.59 | 4.2 | 150 | 310 | 96 | 0.62 | 0.33 |
| Ex. 4 | 98 | 90/10 | 0.52 | 3.7 | 140 | 331 | 85 | 0.45 | 0.30 |
| Ex. 5 | 91 | 89/11 | 0.46 | 3.7 | 140 | 332 | 82 | 0.37 | 0.36 |
| Ex. 6 | 97 | 90/10 | 0.53 | 3.5 | 139 | 333 | 92 | 0.39 | 0.30 |
| Ex. 7 | 96 | 95/5 | 0.51 | 3.4 | 137 | 341 | 91 | 0.40 | 0.35 |
| Comp. Ex. 1 | 2 | 100/0 | 0.60 | 2.4 | 135 | 351 | 83 | <<0.10 *8 | — |
| Comp. Ex. 2 | 6 | 99/1 | 0.59 | 2.4 | 136 | 347 | 82 | <<0.10 *8 | — |
| Comp. Ex. 3 | 95 | 52/48 | 0.40 | — | 163 | None | — | 0.45 | 0.35 |
| Comp. Ex. 5 | Granular | *10 | — | — | 114 | 313 | — | 0.38 | 0.33 |

*6 Measured in accordance with JIS K-0069-31 (values for granules).
*7 Measured in accordance with JIS K-6721-33 (values for granules).
*8 Values for the whole resin collected.
*9 Compositional ratio of recurring units (I) to recurring units (II).
*10 Compositional ratio of recurring units (I) to phenylene thioether recurring units of 33/67 (unit/unit).

[Example 8]

(1) Unstretched film (FN-6)

Ten batch processes of polymerization were conducted in accordance with the same formulation as in Example 6. Ten batches of the polymer thus obtained were mixed with each other to provide Resin (P-6). Resin (P-6) was found to have a compositional ratio of the recurring units (I) to the recurring units (II) of 90:10

340° C. The extrudate was quenched and then chopped into pellets. These pellets were crystallized at 155° C. to obtain a pellet sample (PL-6).

A portion of the pellet sample (PL-6) was melt-extruded through an extruder having a cylinder diameter of 35 mm and an L/D ratio of 28 and equipped with a T-die having a lip clearance of 0.5 mm and a width of 250 mm. The melt extrusion temperature was preset to 340° C. The thus-extruded resin was pressed against a casting drum controlled at about 90° C. by applying a static potential of 5.6 KV via a pinning apparatus to cool the resin, thereby obtaining an unstretched thick film (FN-6) having an average thickness of about 0.2 mm. This unstretched thick film (FN-6) was transparent and substantially amorphous.

(2) Unstretched film (FN-7)

Ten batch processes of polymerization were conducted in accordance with the same formulation as in Example 7. Ten batches of the polymer thus obtained were mixed with each other to provide Resin (P-7). Resin (P-7) was found to have a compositional ratio of the recurring units (I) to the recurring units (II) of 95:5 (unit/unit) and $\eta_{inh}$ of 0.50 dl/g from the results of its elemental analysis and solution viscosity measurement.

To 100 parts by weight of Resin (P-7), were added 0.45 parts by weight of strontium carbonate and 0.05 parts by weight of slaked lime. They were then intimately mixed in a Henschel mixer into a blend. The thus-obtained blend was extruded in the form of a strand through a twin-screw midget extruder equipped with a nozzle 3 mm across at a melting temperature of 350° C. The extrudate was quenched and then chopped into pellets. These pellets were crystallized at 155° C. to obtain a pellet sample (PL-7).

A portion of the pellet sample (PL-7) was melt-extruded through an extruder having a cylinder diameter of 35 mm and an L/D ratio of 28 and equipped with a T-die having a lip clearance of 0.5 mm and a width of 250 mm. The melt extrusion temperature was preset to 350° C. The thus-extruded resin was pressed against a casting drum controlled at about 90° C. by applying a static potential of 5.6 KV via a pinning apparatus to cool the resin, thereby obtaining an unstretched thick film (FN-7) having an average thickness of about 0.2 mm. This unstretched thick film (FN-7) was transparent and substantially amorphous.

(3) Unstretched film (FN-C1)

Ten batch processes of polymerization were conducted in accordance with the same formulation as in Comparative Example 1. Ten batches of the polymer thus obtained were mixed with each other to provide Resin (P-C1). Resin (P-C1) was found to have a compositional ratio of the recurring units (I) to the recurring units (II) of 100:0 (unit/unit) and $\eta_{inh}$ of 0.60 dl/g from the results of its elemental analysis and solution viscosity measurement.

To 100 parts by weight of Resin (P-C1), were added 0.45 parts by weight of strontium carbonate and 0.05 parts by weight of slaked lime. They were then intimately mixed in a Henschel mixer into a blend. The thus-obtained blend was extruded in the form of a strand through a twin-screw midget extruder equipped with a nozzle 3 mm across at a melting temperature of 360° C. The extrudate was quenched and then chopped into pellets. These pellets were crystallized at 155° C. to obtain a pellet sample (PL-C1).

A portion of the pellet sample (PL-C1) was melt-extruded through an extruder having a cylinder diameter of 35 mm and an L/D ratio of 28 and equipped with a T-die having a lip clearance of 0.5 mm and a width of 250 mm. The melt extrusion temperature was preset to 360° C. The thus-extruded resin was pressed against a casting drum controlled at about 90° C. by applying a static potential of 5.6 KV via a pinning apparatus to cool the resin, thereby obtaining an unstretched thick film (FN-C1) having an average thickness of about 0.2 mm. This unstretched thick film (FN-C1) was opaque. This is considered that since the value of $\tau$ of Resin (P-C1) is too small, the film was undergone partially crystallization during cooling in the case of this thick film.

(4) Stretched film (FH-6)

The unstretched thick film (FN-6) was stretched 2.5 times in the machine direction and 2.5 times in the transverse direction at a stretching temperature of 160° C. by a biaxial stretching machine (manufactured by Toyo Seiki Seisakusho, Ltd.), thereby obtaining a biaxially-stretched film with ease. The biaxially-stretched film thus obtained was fixed to a metal frame along the entire periphery thereof to heat set the film for 10 minutes at 250° C. in a Geer oven while maintaining the length of the film constant, thereby obtaining a stretched and heat-set film (FH-6).

(5) Stretched film (FH-7)

The unstretched thick film (FN-7) was stretched 2.5 times in the machine direction and 2.5 times in the transverse direction at a stretching temperature of 160° C. by the biaxial stretching machine (manufactured by Toyo Seiki Seisakusho, Ltd.), thereby obtaining a biaxially-stretched film with ease. The biaxially-stretched film thus obtained was fixed to a metal frame along the entire periphery thereof to heat set the film for 10 minutes at 250° C. in a Geer oven while maintaining the length of the film constant, thereby obtaining a stretched and heat-set film (FH-7).

(6) Trial production of stretched film (FH-C1)

The unstretched thick film (FN-C1) was stretched 2.5 times in the machine direction and 2.5 times in the transverse direction at a stretching temperature of 160° C. by the biaxial stretching machine (manufactured by Toyo Seiki Seisakusho, Ltd.). However, since the unstretched film (FN-C1) partially crystallized, it was considerably difficult to produce a biaxially-stretched film, so that the film broke during the stretching process. It was therefore impossible to obtain a biaxially-stretched film which was satisfactory.

The physical properties of the respective unstretched films and stretched films thus obtained were measured. The results are given collectively in Table 3.

TABLE 3

| | Sample | | | | |
|---|---|---|---|---|---|
| | FN-6 | FN-7 | FN-C1 | FH-6 | FH-7 |
| Composition (unit/unit) | 90/10 | 95/5 | 100/0 | 90/10 | 95/5 |
| Thickness (mm) | 0.209 | 0.204 | 0.200 | 0.033 | 0.033 |
| Density[11] (g/cm$^3$) | 1.31 | 1.31 | 1.31 | 1.36 | 1.36 |
| Strength[12] (kg/mm$^2$) | 10.0 | 10.5 | 9.0 | 10.0 | 10.5 |
| Elastic modulus[12] (kg/mm$^2$) | 270 | 300 | 250 | 270 | 300 |
| Elongation[12] (%) | 9 | 13 | 12 | 9 | 20 |
| Surface roughness, Ra[13] ($\mu$m) | — | — | — | 0.05 | 0.07 |
| Coefficient of surface dynamic friction (against Teflon)[14] | — | — | — | 0.3 | 0.4 |
| Heat shrinking[15] rate (320° C.) (%) | — | — | — | 2 | 1 |
| Solder heat[16] | Blist | Blist | Blist | NC | NC |

TABLE 3-continued

| | Sample | | | | |
|---|---|---|---|---|---|
| | FN-6 | FN-7 | FN-C1 | FH-6 | FH-7 |
| resistance (320° C.) | | | | | |

(Notes)
Blist: Blistered. NC: Not changed.
[11]Density was measured at 23° C. by using a lithium bromide/water system density gradient tube.
[12]Strength, elastic modulus and elongation were measured by using TENSILON (manufactured by Toyo Boldwin Co., Ltd.) in accordance with ASTM D-638.
[13]Surface roughness, Ra (μm) was measured by using a surface roughness meter (SURFCOM 550A, manufactured by Tokyo Seimitsu Co., Ltd.) in accordance with JIS B-0601.
[14]Coefficient of surface dynamic friction was measured by using a "Friction Meter TR Model" (manufactured by Toyo Seiki Seisakusho, Ltd.) in accordance with ASTM D-1894.
[15]Heat shrinking rate was determined by heating each film sample for 10 minutes in a Geer oven controlled at 320° C.
[16]Solder heat resistance was determined by visually observing the condition of each film sample after immersed for 10 seconds in a solder bath in accordance with JIS C-6481 (1976).

[Example 9]

(1) Unstretched fibers (SN-6) and stretched fibers (SH-6)

A portion of Resin (P-6) obtained in Example 8 was extruded through a Capirograph (manufactured by Toyo Seiki Seisakusho, Ltd.) equipped with a nozzle having a diameter of 1.0 mm and an L/D ratio of 10 at an extrusion speed of 10 mm/sec and an extrusion temperature of 350° C. The extrudate was then quenched in cooling air to obtain unstretched fibers (SN-6). Their average diameter was 0.24 mm.

The unstretched fibers (SN-6) were stretched 4 times at 157°–158° C. by TENSILON (manufactured by Toyo Boldwin Co., Ltd.). The stretched fibers thus obtained were heat set for 5 minutes at 320° C. in a Geer oven, thereby obtaining stretched and heat-set fibers (SH-6).

(2) Unstretched fibers (SN-7) and stretched fibers (SH-7)

A portion of Resin (P-7) obtained in Example 8 was extruded through a Capirograph (manufactured by Toyo Seiki Seisakusho, Ltd.) equipped with a nozzle having a diameter of 1.0 mm and an L/D ratio of 10 at an extrusion speed of 10 mm/sec and an extrusion temperature of 360° C. The extrudate was then quenched in cooling air to obtain unstretched fibers (SN-7). Their average diameter was 0.20 mm.

The unstretched fibers (SN-7) were stretched 4 times at 157°–158° C. by TENSILON (manufactured by Toyo Boldwin Co., Ltd.). The stretched fibers thus obtained were heat set for 5 minutes at 320° C. in a Geer oven, thereby obtaining stretched and heat-set fibers (SH-7).

(3) Unstretched fibers (SN-C1) and stretched fibers (SH-C1)

A portion of Resin (P-C1) obtained in Example 8 was extruded through a Capirograph (manufactured by Toyo Seiki Seisakusho, Ltd.) equipped with a nozzle having a diameter of 1.0 mm and an L/D ratio of 10 at an extrusion speed of 10 mm/sec and an extrusion temperature of 370° C. The extrudate was then quenched in cooling air to obtain unstretched fibers (SN-C1). Their average diameter was 0.22 mm.

The unstretched fibers (SN-C1) were stretched 4 times at 157°–158° C. by TENSILON (manufactured by Toyo Boldwin Co., Ltd.). The stretched fibers thus obtained were heat set for 5 minutes at 320° C. in a Geer oven, thereby obtaining stretched and heat-set fibers (SH-C1).

The physical properties of the respective unstretched fibers and stretched and heat-set fibers thus obtained were measured.

The results are given collectively in Table 4.

TABLE 4

| | Sample | | | | | |
|---|---|---|---|---|---|---|
| | SN-6 | SN-7 | SN-C1 | SH-6 | SH-7 | SH-C1 |
| Composition (unit/unit) | 90/10 | 95/5 | 100/0 | 90/10 | 95/5 | 100/0 |
| Fiber diameter (mm) | 0.24 | 0.20 | 0.22 | 0.10 | 0.08 | 0.09 |
| Density[11] (g/cm³) | 1.31 | 1.31 | 1.31 | 1.35 | 1.35 | 1.35 |
| Strength[17] (kg/mm²) | 11 | 10 | 10 | 24 | 41 | 35 |
| Elastic modulus[17] (kg/mm²) | 180 | 260 | 260 | 470 | 700 | 680 |
| Elongation[17] (%) | 170 | 260 | 250 | 39 | 26 | 25 |
| Heat shrinking[15] rate (320° C.) (%) | — | — | — | 2 | 1 | 1 |

(Notes)
[11] and [15]: See Notes in Table 3.
[17]Strength, elastic modulus and elongation were measured by using TENSILON (manufactured by Toyo Boldwin Co., Ltd., at a drawing rate of 50 mm/min and 23° C.

What is claimed is:

1. An aromatic thioether ketone/thioether sulfone random copolymer comprising recurring units of the formula (I):

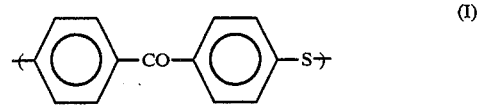

and recurring units of the formula (II):

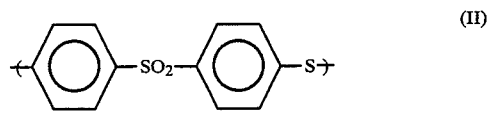

(a) the compositional ratio (I:II) of the recurring units (I) to the recurring units (II) ranging from 98:2 to 65:35, (b) the solution viscosity ($\eta_{inh}$) being at least 0.3 dl/g as determined by viscosity measurement at 30° C. and a polymer concentration of 0.4 g/dl in a 1:1 (by weight) mixed solvent of m-chlorophenol and 1,2,4-trichlorobenzene, (c) the melt crystallization time ($\tau$) being 3–15 minutes, (d) the melting point (Tm) being 300°–350° C., (e) the glass transition temperature being at least 125° C., (f) the retention (400° C./20 min) of melt crystallization enthalpy ($\Delta Hmc$) being at least 60%, wherein the $\Delta Hmc$ retention (400° C./20 min) is determined by measuring, by means of a differential scanning calorimeter, (1) melt crystallization enthalpy, $\Delta Hmc$ (400° C./1 min) and (2) melt crystallization enthalpy, $\Delta Hmc$ (400° C./21 min) when cooled at a rate of 10° C./min from 400° C. after the copolymer is held at 50° C. for 5 minutes in an inert gas atmosphere, heated to 400° C. at a rate of 100° C./min and then held, respectively, for 1 minute at 400° C. and for 21 minutes at 400° C., and then calculating the retention in accordance with the following equation:

ΔHmc retention (400° C./20 min) =

[ΔHmc (400° C./21 min)/ΔHmc (400° C./1 min)] × 100, and (g) the average particle size being at least 0.1 mm.

2. The copolymer as claimed in claim 1, wherein the compositional ratio (I:II) of the recurring units (I) to the recurring units (II) ranges from 96:4 to 85:15.

3. The copolymer as claimed in claim 1, wherein the melting point (Tm) is 305°–345° C., the glass transition temperature (Tg) is at least 130° C. and the retention (400° C./20 min) of melt crystallization enthalpy (ΔHmc) is at least 80%.

4. The copolymer as claimed in claim 1, wherein the copolymer has an average particle size within a range of 0.15–3.0 mm and contains granules having a particle size of at least 0.1 mm in a proportion of at least 70 wt. %.

5. The copolymer as claimed in claim 1, wherein the copolymer has a bulk specific gravity of 0.15–0.6 g/cc.

* * * * *